Feb. 11, 1969  OLE-BENDT RASMUSSEN  3,427,654
METHOD AND APPARATUS FOR PRODUCTION OF SPLIT FIBER
Filed April 8, 1966

INVENTOR
OLE-BENDT RASMUSSEN

BY  Sol Shappirio
ATTORNEY

United States Patent Office 3,427,654
Patented Feb. 11, 1969

3,427,654
METHOD AND APPARATUS FOR PRODUCTION OF SPLIT FIBERS
Ole-Bendt Rasmussen, 28 Rugmarken, Farum, Denmark
Filed Apr. 8, 1966, Ser. No. 541,206
U.S. Cl. 225—3          8 Claims
Int. Cl. B26f 3/00; B65h 35/10; D02g 3/00

ABSTRACT OF THE DISCLOSURE

Split fibers are made by stacking film in a machine direction by a material reduction of the speed while traveling towards, and being passed through a device in which the stacked film is compressed and subjected to a rolling and rubbing treatment in a lateral direction in respect of the direction of orientation to effect final splitting and bulkage of the split material.

---

Figure 1:
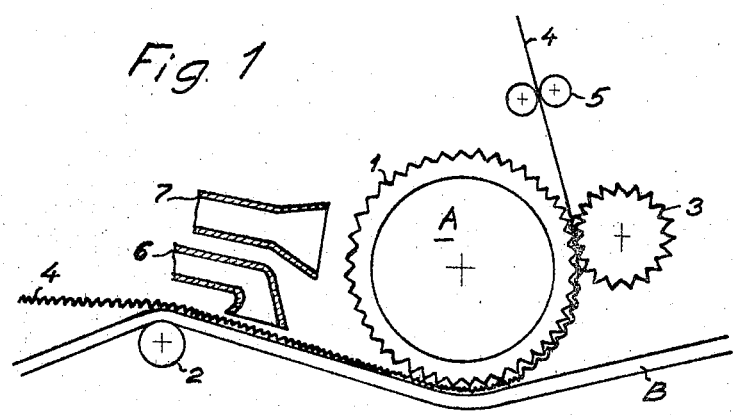

The present invention relates to a method for the production of split fibers from a longitudinally oriented polymer material in the form of an unsplit or partially split film, and to an apparatus for carrying out the said method.

Longitudinal orientation of polymer films is generally performed by stretching the film to several times its original length, and it is known that the resulting unidirectionally oriented film can be split into individual fibers, or into a network of interconnected fibers, by a mechanical treatment, for example, by rolling and twisting the film perpendicularly to the direction of orientation, as between two rubber surfaces.

It is the main object of the invention to provide a method which makes it possible in a simple manner to split a continuous, oriented film or ribbon of oriented, polymer material, which may have been subjected to an initial splitting, into a web or network of split fibers, in which each fiber is branching-off from one or several other fibers to form a two- or three-dimensional continuous reticular structure of relatively fine meshes, the said structure being highly bulky, and the said meshes being expanded to an open state.

With this object in mind, the general principle of the present method is to cause the oriented polymer material to pass through a splitting device in such manner that the direction of orientation is substantially perpendicular to the machine direction.

Accordingly, the present method is characterized in stacking the film in the machine direction by a material reduction of its speed while travelling towards, and being passed through a device, in which the stacked film is compressed and subjected to a rolling and rubbing treatment in a lateral direction in respect of the direction of orientation to effect final splitting and bulking of the split material.

By the stacking, the film or ribbon is piled up in slings and the compression will cause the slings to turn over laterally, if they enter the splitting device in an upright position. If rather wide films are used, a presplitting in known manner may be necessary in order that the individual coarse fibers produced by the presplitting may be turned over laterally by the compression.

Preferably, however, the present method is applied to rather narrow films or ribbons, and an embodiment of the present method is characterized in that the stacking is accomplished by piling up the oriented film in lateral slings while moving it forward into engagement with the splitting device, and passing the thus stacked or compressed film through the splitting device in a direction substantially perpendicular to the direction of orientation, while subjecting it to a rubbing to effect splitting.

In this manner, a fibrous product is obtained, which can be used for twine and similar coarse yarns without further splitting.

In order to obtain a network of extremely fine fibers, and to impart bulk to the resulting product, the splitting procedure, however, can be repeated once or several times in additional devices substantially similar to the first one.

The bulk of the web may be stabilized by a fixation process, such as a heat treatment, or a swelling, or an irradiation, or a chemical cross-linking, or a polymerization in situ, or by application to the surface of a polymer acting as a fixative, the effect being either to change the crystal structure, or to introduce cross-links, or to incorporate or apply new material. In any case, the aim is to avoid realignment of the fibers during stretching of the web. The split fiber material may, however, also be used in the state in which it leaves the splitting and randomizing device, without carrying out such a fixation.

The split fiber materials produced according to the invention can be used for textile yarns, normally after twisting, as layers in nonwoven fabrics, for carpet yarns, twines and ropes, for technical insulation purposes and other uses.

In another embodiment of the present method, the film is carried forward to the splitting device through a tube by means of pressurized air. By suitably adjusting the air pressure to a value not substantially exceeding that necessary for keeping the film moving forward through the tube, the film will automatically stack in a neat pile in front of the splitting device. In this manner, the very light film is effectively guided while travelling towards the splitting device, resulting in a neat piling in front of the latter.

A series of guiding tubes may be used for a corresponding number of films in order to effectively utilize the width of the splitting device.

A shuttle movement of the film at the end of the tube may be accomplished by means of air jets acting alternately in opposite directions perpendicular to the film as it leaves the tube, but a preferred method is to impart the shuttle movement to an elastic extension of the tube itself, through which the film is carried forward. For example, a metal tube or a glass tube may be used, to the end of which is fitted a piece of rubber tubing, the end of which is set into a pendulating movement. If several tubes are used, each of which is fitted with its piece of rubber tubing, the rubber tubings may be interconnected so as to be set into pendulating movement from a single actuating device.

The pressurized air carrying the film through the tube leaves the pile of film in front of the splitting device, and in a preferred embodiment of the present method, the splitting is carried out by subjecting the stacked film to a rubbing in the splitting device between two members, the surfaces of which are continuously performing a rolling movement at different velocities in the travelling direction of the film, the surface velocity of one of the said members being several times that of the other.

Preferably, a splitting device is used, in which at least one of the rubbing members is an endless rubber belt. The other member can be a rubber-covered roller, or preferably another endless rubber belt may be used, which is pressed against the first one by means of a roller.

It has been found that in this manner an effective splitting is obtained, resulting in a substantially homogeneous network of split fibers.

In the production of fine split fibers for proper textiles, for instance from a polyamide, an oriented film is preferably used, which has been supplied with internal cracks or splits. This can advantageously be accomplished by the development in the film of an internal gas pressure or an osmotic pressure by means of incorporated substances.

Furthermore, a presplitting can advantageously be produced by means of a set of rubber belts which are expanded while enclosing the oriented film in so strong a frictional engagement that the film must partake in the the expansion.

Although the compression or stacking of the film or web and the splitting-up essentially take place as two different process steps, the zone in which splitting takes place may follow immediately after the zone in which compression takes place without any sharp distinction between the two zones.

The invention further relates to an apparatus for carrying out the present method, said apparatus comprising means for forwarding an oriented, polymer film towards a splitting device, and means for piling up the film in slings in front of, and passing the thus stacked or compressed film through said splitting device, the latter comprising at least two rubbing members with frictional surfaces, means being provided for imparting a forward movement of the surfaces of the said two members at a velocity which for one of the members is several times that of the other.

To obtain frictional surfaces on the rubbing members of the splitting device, the latter are preferably made from, or covered with a polyurethane rubber, owing to the considerable wear-resistance of this kind of rubber.

Preferably, at least one of the rubbing members of the splitting device is an endless rubber belt. Owing to the difference in surface speed of the said members, they are subjected to considerable wear, and it is, therefore, an advantage to have this wear spread over the greater surface provided by a rubber belt, as compared, for example, with that of a rubber covered roller.

In the following, the present method will be further explained with reference to the accompanying drawings, schematically illustrating two embodiments of an apparatus for carrying out said method.

Figure 2:
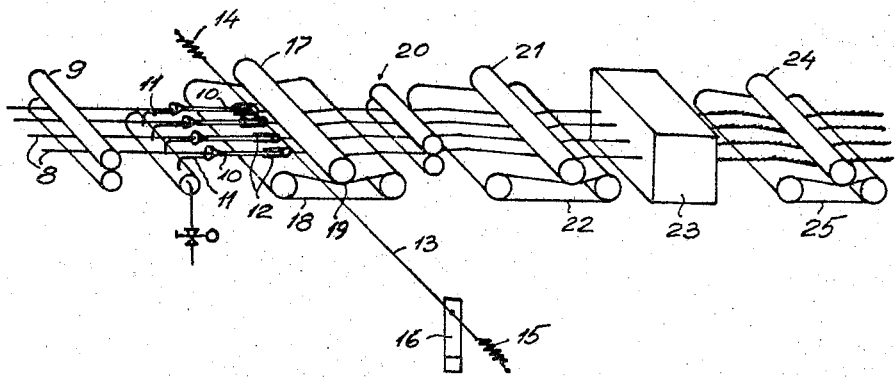

FIG. 1 being a sectional view of one embodiment, and FIG. 2 a perspective view of another embodiment.

The apparatus of FIG. 1 consists of two frictional members, which are positioned for mutual contact, preferably over a zone of at least some centimeters, both frictional members being constructed for endless movement, one of the said members A being driven to move at a speed which linearly is several or many times as high as the speed of the other frictional member B, and the said movements of A and B having the same direction. Furthermore, the frictional member A is supplied with means for only loosely engaging the film to follow its movement unto the entrance of the said zone of contact. The apparatus is furthermore supplied with means for adjusting the pressure of the members A and B against each other.

The frictional members A and B can be rollers or endless belts. As means for engaging the film in the movement of A and releasing it after the contact with the slow moving member B, in order to stack the material, the surface of A preferably consists of cogs or knives made from an elastomer having a high wear resistance, but only a relatively low coefficient of friction, as for instance a polyurethane rubber, whereas B preferably has a plain surface and consists of an elastomer having a high coefficient of friction, as for instance only slightly vulcanized natural rubber. In order to remove the heat produced by the friction, the apparatus may furthermore comprise means for cooling the frictional members.

More particularly, the frictional member A is a roller having a cogged surface 1, which has been cast from urethane rubber, whereas B represents a part of an endless belt made from natural rubber which has been slightly vulcanized. The lineary speed of A may be 5–20 times that of B or even faster. The tension of the belt B, and thus the frictional forces in the zone of contact, can be adjusted by means of an adjustable idle roller 2. The means for adjustment are not shown.

A roller 3, which is supplied with cogs corresponding to the cogs of the frictional member A, serves to fold the film 4 around the cogs of the member A, and the film is hereby made to partake in the movement of the member A, but only in a weak engagement, and when it meets the relatively slow and highly frictional rubber belt B, it slips from A and is stacked by relatively high compressive forces. In addition to the compression, the film is split up by the frictional shear exerted by A and B, and simultaneously the shear and pressure produce randomization of the fibers and bulk of the product.

It is, as already mentioned, normally preferable to repeat the process one or several times. To this end the apparatus shown in the drawing may be modified to comprise a series of rollers like A, all to work together with one and the same rubber belt B.

The rollers 5 represent a device which facilitates the first splitting. It should be understood that the said set of rollers are reciprocated axially. They hereby impart a shuttle movement to the film, so that the average direction of orientation in the compressed and stacked film becomes almost perpendicular to the machine direction. This is advantageous only when the film is substantially unsplit, or if the fibers in the split web to be further split are substantially unrandomized. In order to increase the process velocity, the rollers 5 can be substituted by two sets of air-nozzles, one to blow the film to one side and the other to blow the film to the other side.

The apparatus furthermore comprises fans, represented by the outlets 6 and 7, for cooling the belt B and the elastomer part of the roller A, respectively. The cogs 1, being made from an elastomer which has a relatively low coefficient of friction and which is highly wear-resistant, have sufficient lifetime. The belt, being made from an elastomer which has a higher coefficient of friction and a lower wear resistance, is worn down relatively quickly, but this is compensated for by making the belt sufficiently thick.

An oven for annealing, or other apparatus for carrying out fixation as described above, may be installed in succession to the apparatus shown in the drawing.

The splitting and randomizing apparatus of FIG. 1 has the advantage of being simple and cheap in construction, and being able to work at a relatively high speed, as the rubbing action is continuous and follows the machine direction.

Referring now to FIG. 2, showing diagrammatically a more advanced apparatus for simultaneously splitting several oriented films, the films 8 are supplied through a set of rollers 9, being driven at a peripheral speed of 2.3 v., each film passing into one of a series of tubes 10 being conically enlarged to form a funnel at the entrance. Pressurized air supplied through nozzles 11 assists in transporting the films 8 through the tubes 10.

Pieces of rubber tubing 12 are fitted onto the exit ends of the tubes 10, and are interconnected by a string or wire 13 attached at the ends to coiled springs 14 and 15, respectively. A vibrator 16, which may be actuated mechanically, pneumatically, or electromagnetically, actuates the string or wire 13 to impart a shuttle movement to the rubber tubings 12, whereby the films 8 are piled up or stacked in lateral slings before entering a splitting device, comprising a rubber covered roller 17 and an endless rubber belt 18.

The roller 17 is driven with the peripheral speed V, and the belt 18 with speed of 0.1 v., their surfaces, facing each other, moving in the machine direction, and they contact the stacked films 8 in a splitting zone 19, performing a rubbing treatment of the films, whereby the latter are partially split into fibrous webs, which are gripped by a set of rollers 20, being rotated with a peripheral speed of 2.3 v.

In the splitting treatment, the films or ribbons will be carried into the splitting device at a speed substantially equal to the peripheral speed of the roller 17, and they will leave the splitting device at a speed corresponding to that of the belt 18. Thus a considerable compression of the films or ribbons takes place in the splitting device.

From the rollers 20, the fibrous webs pass onto a further splitting device, consisting of a roller 21, being rotated at a peripheral speed of 2 v., and a rubber belt 22 with a speed of 0.25 v.

By the passage through this latter device, a final splitting into very fine interconnected fibers is accomplished.

The resulting networks of fibers are then carried through an electric oven 23 for fixation, and after leaving the oven, they are subjected to a bulking process in a device, similar to the splitting devices, consisting of a rubber covered roller 24, rotating at a peripheral speed of 2.3 v., and an endless rubber belt 25, being driven with a speed of 0.4 v., after which they are collected on reels, ready for use, for example, in yarn making.

This latter type of the apparatus is excellently suited for large scale production. It should be understood, however, that the embodiment described is only illustrative of the type, various modifications being possible. Thus, the number of rubbing devices may be increased in order to obtain increased fineness and bulk of the fibers.

Also the indicated speeds of the various members is illustrative, variations being possible in the relative speeds without departing from the scope of the invention.

For example, the speed of the rollers 9, 20 and 24 may be reduced to 2 v. to correspond to the speed of roller 21, so that the partially split films pass into the device, consisting of roller 21 and belt 22 without previous stacking. The stacking in the said device thus takes place only during the rubbing treatment.

I claim:

1. Method for the production of split fibers from a longitudinally oriented polymer material in the form of an unsplit to partially split film, characterized in stacking the film in the machine direction by a material reduction of its speed while travelling towards, and being passed through a device, in which the stacked film is compressed and subjected to a rolling and rubbing treatment in a lateral direction in respect of the direction of orientation to effect final splitting and bulking of the split material.

2. Method according to claim 1, characterized in that the stacking is accomplished by piling up the oriented film in lateral slings while moving it forward into engagement with the splitting device, and passing the thus stacked film through the splitting device in a direction substantially perpendicular to the direction of orientation, while subjecting it to a rubbing to effect splitting.

3. Method according to claim 1, characterized in that the film is carried forward to the splitting device through a tube by means of pressurized air.

4. Method according to claim 3, characterized in a shuttle movement being imparted to an elastic extension of the tube, through which the film is passed forward.

5. Method according to claim 1, characterized in that the stacked film is subjected to a rubbing in the splitting device between two members, the surfaces of which are moving continuously at different velocities in the travelling direction of the film, the surface velocity of one of the said members being several times that of the other.

6. Method according to claim 5, characterized in that a splitting device is used, in which at least one of the rubbing members is an endless rubber belt.

7. Apparatus for the production of split fibers from a longitudinally oriented polymer material in the form of an unsplit to partially split film characterized in means for forwarding an oriented, polymer film towards a splitting device, means for piling up the film in slings in front of the splitting device, and passing the thus stacked film through said splitting device, the latter comprising at least two rubbing members with frictional surfaces means being provided for imparting a forward movement of the surface of the said members, at a velocity which for one of the members is several times that of the other.

8. Apparatus according to claim 7, characterized in at least one of the rubbing members being an endless rubber belt.

References Cited

UNITED STATES PATENTS 2,500,690  3/1950  Lannan.
3,186,155  6/1965  Breen et al.

JAMES M. MEISTER, *Primary Examiner.*

U.S. Cl. X.R.

225—93; 28—1